United States Patent [19]

Pinyan et al.

[11] Patent Number: 4,677,852

[45] Date of Patent: Jul. 7, 1987

[54] METHOD OF AND APPARATUS FOR INSPECTING AND/OR POSITIONING OBJECTS WITH WAVE ENERGY USING WAVE GUIDES

[75] Inventors: James A. Pinyan, Sunnyvale; B. Shawn Buckley, San Jose, both of Calif.

[73] Assignee: Cochlea Corporation, San Jose, Calif.

[21] Appl. No.: 781,259

[22] Filed: Sep. 27, 1985

[51] Int. Cl.[4] ............................................. G01N 29/00
[52] U.S. Cl. ....................................... 73/628; 73/644; 324/58.5 B
[58] Field of Search .................. 73/627, 628, 624, 625, 73/626, 644; 310/336; 324/207, 226, 58.5 B, 58.5 C, 58.5 R; 209/558, 559, 590; 367/87, 909; 181/400

[56] References Cited

U.S. PATENT DOCUMENTS

| | | | |
|---|---|---|---|
| 3,697,745 | 10/1972 | Bolton | 324/207 |
| 4,255,750 | 3/1981 | Riley | 324/58.5 B |
| 4,434,384 | 2/1984 | Dunnrowicz et al. | 310/336 |
| 4,557,386 | 12/1985 | Buckley et al. | 209/558 |
| 4,576,286 | 3/1986 | Buckley et al. | 209/558 |
| 4,594,897 | 6/1986 | Bantz | 23/644 |

Primary Examiner—Anthony V. Ciarlante
Attorney, Agent, or Firm—Robert Shaw

[57] ABSTRACT

A system for achieving inspecting and/or positioning of an object that includes: an array that is operable to generate acoustic or low-frequency electromagnetic wave energy of a single or narrow band or frequencies, to transmit the wave energy to an interaction region where it interacts with the object and to transmit the wave energy, after interaction, to sensing means, sensors of the array being disposed to receive the wave energy and being operable to convert the wave energy to electric signals representative of the received wave energy; a processor connected to receive the electric signal and adapter to process the signals into amplitude and/or phase information for each sensor; and an analyzer to interpret the amplitude and/or phase information to derive therefrom a characteristic of the object, e.g., a geometric characteristic or an electromagnetic characteristic.

28 Claims, 5 Drawing Figures

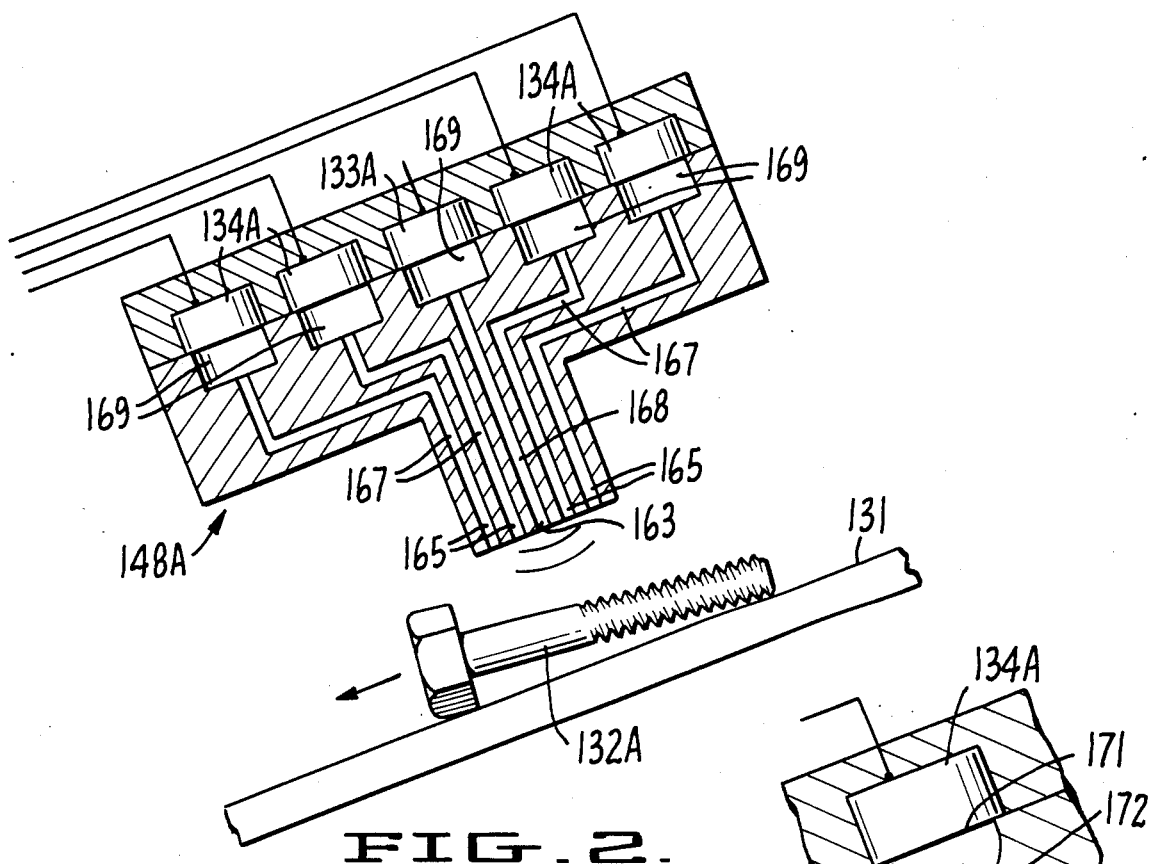
FIG. 2.
FIG. 3B.
FIG. 3A.
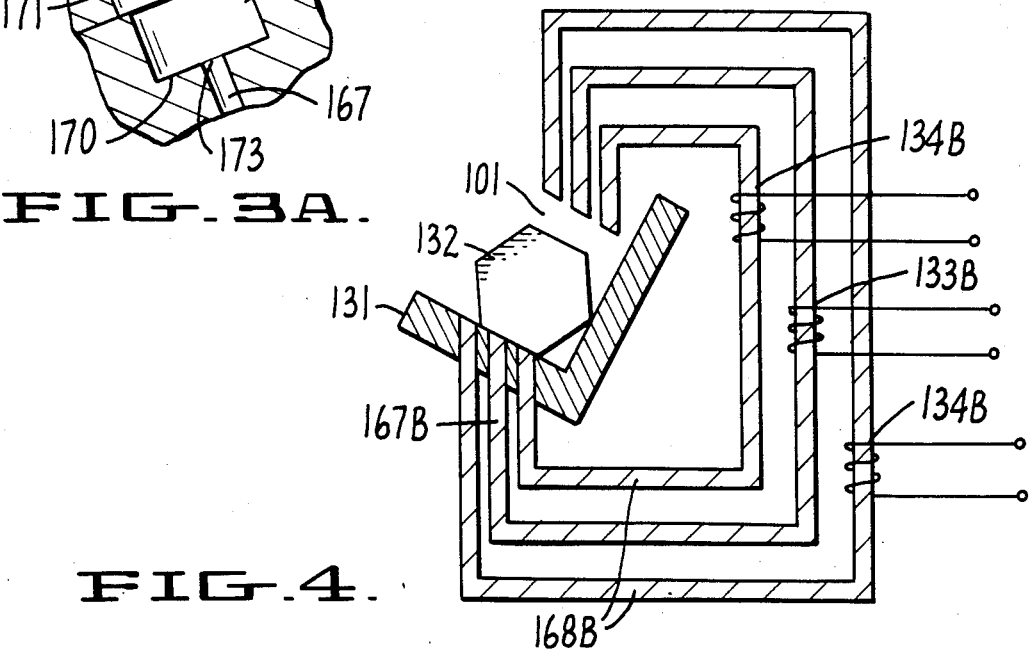
FIG. 4.

METHOD OF AND APPARATUS FOR INSPECTING AND/OR POSITIONING OBJECTS WITH WAVE ENERGY USING WAVE GUIDES

The present invention relates to systems to achieve automatic inspection and/or positioning of objects in manufacturing operations.

Attention is called to U.S. Pat. Nos. 4,095,475 (Buckley), 4,200,291 (Buckley), 4,287,769 (Buckley), and pending applications Ser. Nos. 508,121 (U.S. Pat. No. 4,576,286), 508,122 (U.S. Pat. No. 4,557,386) and 508,123, all filed on June 27, 1983, and assigned to the assignee of this application, the disclosures of which are incorporated herein by reference.

Manufacturing parts often have flaws as a result of the manufacturing process: parts become mixed, dies break, taps break, and stampings have mis-hits which result in flaws in manufactured articles. To ensure quality of the assembly of the manufactured articles, the parts used must be tested and inspected prior to assembly.

In manual assembly the task is easy. A manual assembler notices defects in parts and does not use them to produce a final assembly. With automated equipment such as transfer lines, indexing machines and robots, defective components can jam or break equipment, increasing production costs as the assembly line stops. Moreover, defective sub-assemblies can be produced even if the equipment does not jam—only to create jams further downstream in the production process or ultimately to produce defective products.

A method is needed to detect flaws, quickly and accurately, in parts or components. Optical inspection equipment using lasers and video equipment have been effective in detecting such errors; however, the equipment is expensive and must be programmed to detect the minute differences often required in identifying defects. Another technique is use of acoustic and electromagnetic inspection, as described in the above-mentioned patents and patent applications. In the latter, sound and/or low-frequency electromagnetic wave energy rather than light waves (i.e., electromagnetic wave energy in the optical spectrum) are used to identify correct objects. Certain defects are more readily detected using the latter techniques which are three-dimensional in effect. In addition, the acoustic and low-frequency electromagnetic techniques use cheaper sensors, require less computing power to identify a defect, and are easier to program.

In the systems in the above-mentioned patents and patent applications, waves are directed onto an object by wave sources, setting up an acoustic field or a low-frequency electromagnetic field. Distortions in the field are detected by an array of acoustic or electromagnetic receivers. The received signals are processed, for example, by digitial filters and other circuitry which determine the phase and/or amplitude of the waves received. A computer compares the phase and/or amplitude information to similar information for good objects or good objects at an acceptable location. In some forms, a pattern recognition algorithm reduces the information from the multiplicity of receivers to a single number which indicates how similar an object is to a standard object.

It is an object of the present invention to provide a mechanism wherein wave energy (acoustic or low-frequency electromagnetic) is delivered to an object (from a remote region, e.g., typically less than a meter) where it interacts and the wave energy, after interaction, is delivered to a further remote region (again typically spaced less than a meter from the object) where it is sensed at a multiplicity of spaced places.

These and further objects are addressed hereinafter.

The foregoing objects are attained, generally, in a system for achieving inspecting and/or positioning of an object that includes: a transmitting mechanism for delivering continuous wave energy of a single frequency (or narrow band of frequencies) to an interaction region where the wave energy interacts with the object, the transmitting mechanism including a wave energy generating transducer and a waveguide to conduct the wave energy to the interaction region, further waveguides disposed to receive the wave energy after interaction with the object and to deliver the same to a sensing region, and sensors disposed in an array at the sensing region for receiving the wave energy at a multiplicity of places and producing electric signals representative of the received wave energy, and means connected to receive the electric signals, which means is operable to convert the received signals to amplitude and/or phase information indicative of a geometric characteristic and/or phase information indicative of a geometic characteristic and/or an electromagnetic characteristic of the object.

The invention is hereinafter described with reference to the accompanying drawing, in which:

FIG. 2 is a side section view of one form the wave guides and transducers can take;

FIG. 3A is a side section view of a form of receiving transducer and an associated cavity; and FIG. 3B is a side section view of a form of receiving transducer and associated cavity.

FIG. 4 is a side section view of a form of electromagnetic waveguide.

Figure 1:
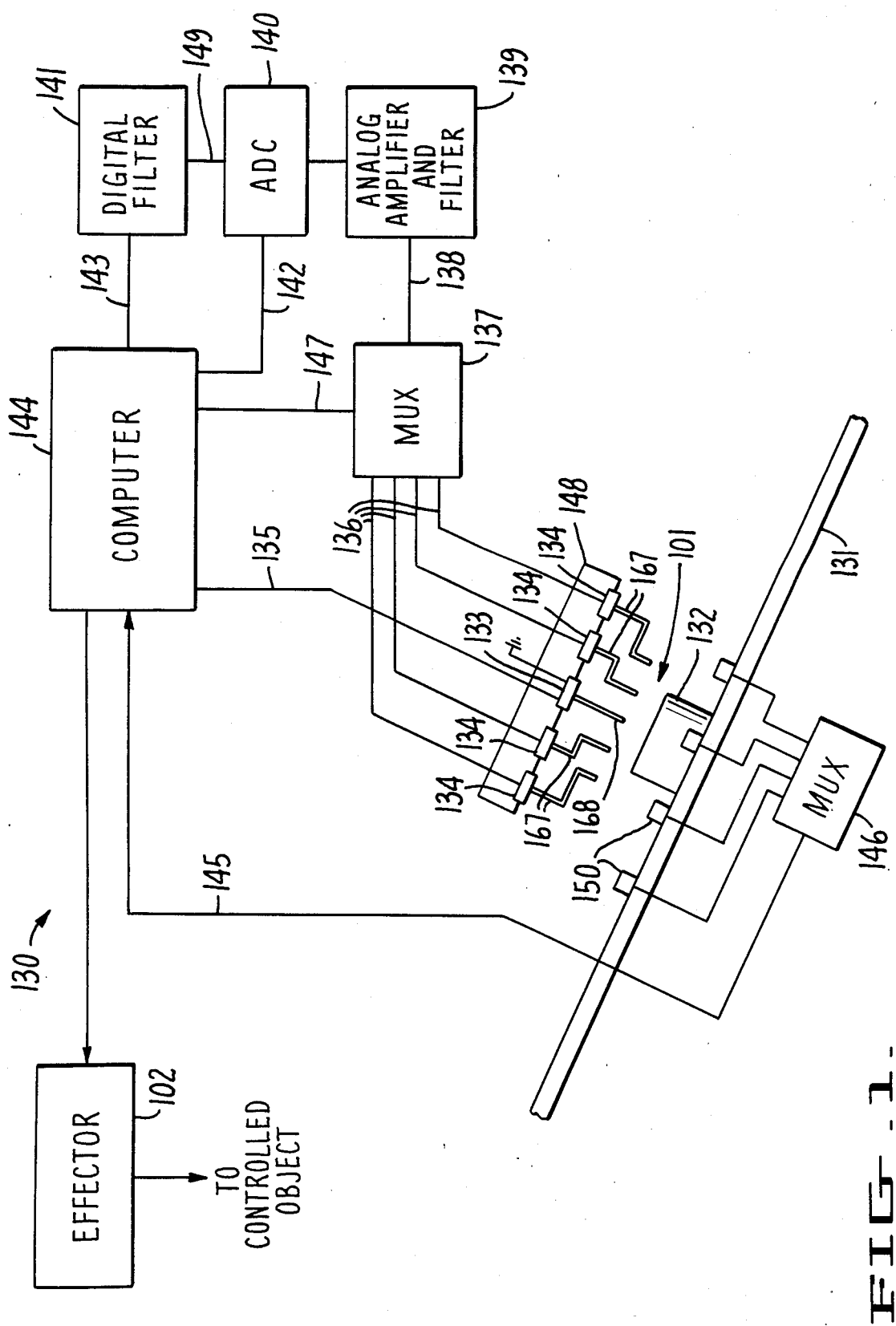
FIG. 1 is a diagrammatic representation of a system to practice the present invention and includes a plurality of waveguides to deliver wave energy from a transmitting transducer to a part and to deliver wave energy (after interaction with the part) from the part to receiving transducers.

There follows a discussion of the techniques by which the present apparatus delivers wave energy to an object 132 in an interaction region 101 in FIG. 1, delivers the wave energy (after interaction with the object) to a sensing region containing an array of spaced-apart sensors 134 whose outputs, as later discussed, contain phase and amplitude information from the various transducers, as further discussed in the aforementioned U.S. Pat. Nos. 4,095,475 and 4,200,291 and the patent application Ser. No. 508,121. The phase and/or amplitude information is used as a basis for performing inspecting and/or positioning functions with respect to the object. The particular embodiment shown emphasizes the inspecting function with respect to parts according to their orientation or shape using acoustic or microwave electromagnetic transmitters 133 and sensors 134, but an effector 102 in FIG. 1 can be employed to grasp an object and, if needed, remove it from the inspection line or recycle it. In what now follows, emphasis is placed on the inspection aspects of the invention.

The apparatus or system shown at 130 in FIG. 1 is primarily intended to achieve inspecting (but can provide other functions, such as positioning, as above indicated) of the object 132. The system 130 includes a mechanism for channeling wave energy at a single frequency (or narrow band of frequencies) in both directions to the interaction region 101 where the energy interacts with the object 132 and from the interaction region 101 after the interaction. Typically, acoustic wave energy in the range from about 20 to about 200 KHz is used. The transmitting mechanism includes a waveguide 168 to transmit the wave energy to the part or object 132 and the waveguides 167 to transmit the wave energy from the part 132. The output energy is generated by a transducer 133 and the received energy is sensed by several spaced-apart sensors 134 disposed in an array 148 to receive the wave energy at a multiplicity of places after interaction with the object 132, as previously indicated. The sensors 134 are operable to convert the acoustic wave energy to electric signals representative of the received energy. The electric signals are processed and analyzed to provide amplitude and/or phase information for each sensor 134. The processing and analyzing elements, as later discussed, include a multiplexor (MUX) 137, an analog amplifier and filter 139, an analog-to-digital converter (ADC) 140, a digital filter 141 and a computer 144 that serves to analyze the information contained in the electric signals.

In FIG. 1 the part 132 is fed along a transport system that includes a chute 131 (see pending application Ser. No. 508,121, for example). Parts similar to the part 132 are fed to the top of the chute 131 by a parts feeder (not shown in the figure to simplify this explanation). In this example, the sensing array 148 includes the transmitting transducer 133 driven by a sinusoidal continuous wave signal from the computer 144 along conductor 135 and the sensing transducers 134.

Continuous-wave waveforms from the transmitting transducer 133 propagate through the waveguide 168 to interact with the part 132; a change in the phase and the amplitude of the waveforms is thereby effected by the part. The wave energy after interaction passes through the waveguides 167 and is detected by the receiving sensors 134 which produce electric signals representative of the acoustic signals and containing phase and amplitude information with respect to the received energy. These electric signals are fed to the multiplexor 137 via conductors 136; the electric signal on each one of the conductors 136 is chosen by the computer 144 to be analyzed. The connection marked 147 is a bus by which the computer 144 instructs the MUX 137 which one of the electric signals on the conductors 136 is chosen. The chosen sinusoidal electric signal from the sensors 134 is fed via connection 138 to the analog amplifier and filter 139 which amplifies or attenuates the signal (as required) and reduces noise at frequencies other than the sinusoidal operating frequency of the transmitted wave energy.

Next, the chosen signal is converted to a digital value in the analog-to-digital converter (ADC) 140. The filtered sinusoidal signal is sampled at various time intervals as determined by a clock signal fed to the ADC 140 by the computer along a connection 142. The sampled values are sent to the digital filter 141 via a bus 149, where they are further filtered to remove noise at frequencies other than the transmitted wave energy frequency. Lastly, the filtered data is transmitted to the computer 144 via a bus 143 for analysis. Analysis of the filtered data first requires that the data be converted to amplitude and/or phase information of the received wave energy for the chosen sensor 134. A Fourier transform algorithm readily converts the digital values to amplitude and/or phase information.

The operation of the MUX 137 to begin the multiplexing of the electric signals at 136 from the sensors 134 is initialized by the object 132 triggering a position detector 150 or a plurality of such position detectors whose outputs are transmitted through a multiplexor (MUX) 146 along a conductor 145 to the computer 144, that is, when one of the position detectors 150 is triggered, a signal is transmitted through the connection 145 to the computer 144. When the signal from the first (i.e. the left-most) position detector 150 is received by the computer, it initiates the signal on the connection 147 to begin data-taking from each successive sensor 134.

The computer, then, orchestrates data-gathering from the sensors 134. First it transmits a continuous wave voltage signal at the proper frequency to the transmitter 133. Then it directs, one after another, the received sensor signal outputs from the MUX 137 to the filter 139 on detection of the object 132 by the detectors 150. The computer 144 also determines the timing and the duration of the data sampling in the ADC 140 and, further, receives and analyzes the amplitude and/or phase information from the digital filter 141. Each sensor signal, in turn, is so processed. The computer 144 also stores the amplitude and phase information from previously processed sensor signals until all of the sensors 134 in the array 14 have been processed.

Given the phase and amplitude information from each sensor 134, analysis involves calculation of the general form $$X = g\left[\sum_{i=1}^{N} W_i f(A_i, \theta_i)\right],$$

X is the desired output,
g is a functional relationship;
$W_i$ is a weighting function chosen for each sensor 134
f is another functional relationship;
$A_i$ is the amplitude of each sensor signal,
$\theta_i$ is the phase of each sensor signal, and
N is the number of sensors.

For example, in determining the diameter of a part 132, the desired output X is the diameter. By choosing the weights $W_i$ to be proportional to each sensor's phase difference between a master part (of diameter D″ and with phase $\theta''_i$) and another part (whose diameter is D′ and with phase $\theta'_i$), the relationship simplifies to:

$$D = \sum_{i=1}^{N} W_i(\theta_i - \theta''_i) + D''$$
$$W_i = \frac{D' - D''}{\theta'_i - \theta''_i}$$

Other relationships g and f are appropriate for other desired outputs such as determining one part from another or one orientation from another.

Now begins a more detailed description of the present invention. In addition to the analysis system just discussed, the present invention includes, as well, new and innovative methods of transmitting the wave energy from the array 148 to the object 132 and from the object 132 back to the array 148.

Now consider a system where the wave energy is acoustic. In FIG. 2, the acoustic array is marked 148A; it includes both the transducers in FIG. 2 and the waveguides (whereas the designation 148 in FIG. 1 includes only the transducers). The object (a bolt) in FIG. 2 is marked 132A. To give the best discrimination of the object 132A, the sound emission point labeled 163 and the receiver points labeled 165 should be as close as possible to the object 132A. However, the acoustic transducer shown at 133A (for transmitting acoustic wave energy to the object 132A) and 134A (for receiving acoustic wave energy from the object 132A) are typically a centimeter or more in diameter in order effectively to couple their sound-producing diaphragm to the air. The array 148 of transducers in FIG. 1 covers too large an area to allow the transducers 133 and 134 to be in close proximity to the object 132.

In the present system, however, sound waves are piped through the thin passages or ducts 167 and 168 whose ends 165 and 163, respectively, converge into a very small region, much smaller than that taken up by the transducers 133A and 134A. Sound waves can be transmitted through the passages in both directions to and from the object 132A (or 132); sound waves from the transmitter 133A are directed toward the object 132A through the passage 168 while reflected sound signals are transmitted from the object 132A through the similar passages 167 to the sound receivers 134A.

It will be noted that for maximum transmission efficiency, two parameters are important. First, the diameter (that is, the dimension perpendicular to the passage's transmission direction) of the passages 167 and 168 is usually small compared to the wavelength of the sound being tansmitted. For example, in transmitting sound at 40 KHz in air in which the wavelength of the acoustic wave energy is approximately one centimeter, passages 0.1 centimeter in diameter transmit the acoustic wave adequately. The acoustic waves are transmitted around right-angle bends in the passages 167 and 168 at the corners. If larger diameter (compared to wavelength) passages 167 and 168 are used, transmission can be attenuated by sharp corners. Smooth passages 167 and 168 without sharp corners (such as those used in a trumpet or a trombone) will transmit acoustic energy even at large diameter-to-wavelength ratios.

Second, a coupling volume 169 should be employed to achieve proper coupling between each transducer and its associated narrow passage or waveguide. The coupling volume 169 allows an impedance match between a transducer 133A or 134A and the respective narrow passage 167 or 168. In the simplest embodiment, the coupling volume 169 is designed such that a standing wave of the transmitted frequency is set up between the transducer diaphragm shown at 171 in FIG. 3A and the wall labeled 170 of the volume or cavity 169.

Another effectively-shaped cavity is that shown at 169A in FIG. 3B which shows a horn 172 with sigmoidal cross-section to couple the transducer 134A in FIG. 3B to the passage 167. It will be noted that the transmitter 133A and the receivers 134A each must have the coupling volume 169; the transmitter 133A to couple its moving diaphragm to the air in the passage 168 and the receivers 134A to couple the air in the passages 167 to the receiver diaphragm.

Transmitting sound waves from the transducers 133A and 134A through thin passages accomplishes two other important functions. First, it protects the transducers 133A and 134A from dust particles often associated with the object 132A being inspected. Second, the array 148A becomes much less sensitive to temperature changes. Most of the path between the transmitter 133A and the receivers 134A is enclosed; hence, the air temperature in the passages 167 and 168 changes very little. Because the most accurate measurements are sensitive to the air temperature through which the sound in the passages 167 and 168 will travel, the measurement noise associated with temperature changes is substantially reduced. Conversely, in an "open" array, the measurements are much noisier because the air temperature between the transducers and the object or part can change quickly.

Rather than an acoustic system, the system described in FIG. 2 may also be a microwave system. The transmitter 133A is a microwave source which transmits microwaves through passage 168; microwaves are emitted at the opening 163 and reflect from the object 132A. Reflected waves are picked up at receiver openings 165 and transmitted through passages 167 where their phase and amplitude information is detected by receivers 134A for later analysis.

As in acoustic waves, cavities such as those shown in FIGS. 3A and 3B can be used to ensure efficient transmission of the waves through the waveguides 167 and 168. In the case of microwaves, the waveguides 167 and 168 as well as the walls of the cavities 169 and 169A must be constructed of a conducting material such as a metal to properly guide the microwaves.

In a third embodiment of the present invention, even lower-frequency electromagnetic waves are guided. Shown in FIG. 4 is an object 132 sliding down a parts chute 131 as seen in cross-section. The parts chute 131 is made of a non-conducting material such as ceramic or plastic. Electromagnetic waves are produced by coil 13B driven by a sinusoidal voltage (like the one driving the acoustic transmitter 133A in FIG. 2).

The electromagnetic field produced by the coil 133B is guided through the ferromagnetic material (i.e., material having a high effective permeability) of the waveguide 167B forming a magnetic circuit which is "closed" by the metallic or semiconducting object 132. An electric motor armature uses similar guides to direct magnetic fields for efficient motor operation.

The electromagnetic field produces eddy-currents in a conducting part 132; these eddy-currents alter the electromagnetic field surrounding the object 132. Receiver coils 134B are of similar construction as the transmitting coil 133B. Ferromagnetic material guides the sinusoidal magnetic field at its ends in the interaction region 101 to the receiver coil 134B. The receiver coils 134B form magnetic circuits with the guides 168B; the impedance of the circuit is altered by the eddy-currents set up by the transmitting coil 133B.

In each of the cases described, the purposes of the guides are the same: to duct wave energy from point of application to remotely-located transducers.

Further modifications of the invention herein disclosed will occur to persons skilled in the art and all such modifications are deemed to be within the scope of the invention as defined by the appended claims.

What is claimed is:

1. Apparatus for achieving at least one of inspecting and positioning of an object, that comprises:
   an array adapted to generate continuous wave energy of a single frequency, to transmit the wave energy to an interaction region where it interacts with the object, said array including a plurality of waveguides to transmit the energy in both directions to and from the objects and further including sensor means comprising a multiplicity of spaced-apart sensors disposed to receive said wave energy at a multiplicity of places after interaction with the object, said sensor means being adapted to produce electric signals representative of the received wave energy, said array comprising a transducer to generate said continuous wave energy which is transmitted by a waveguide of the plurality of waveguides to the interaction region, said array comprising a coupling volume to achieve enhanced coupling between the waveguides and the transducer and the sensor means;

means for processing the electric signals into at least one of amplitude and phase information for each sensor of the sensor means; and means for analyzing said at least one of amplitude and phase information from each sensor of the multiplicity of sensors into at least one of a geometric characteristic and an electromagnetic characteristic of the object.

2. Apparatus according to claim 1 in which the wave energy is acoustic wave energy, in which the plurality of waveguides is a plurality of acoustic waveguides, and in which said transducer is an acoustic transducer to generate the acoustic wave energy which is transmitted by one waveguide of the plurality of acoustic waveguides to the interaction region.

3. Apparatus according to claim 2 in which the wave energy after interaction with the object is transmitted to the sensing means by return acoustic waveguides of the plurality of acoustic waveguides.

4. Apparatus according to claim 3 in which a coupling volume is interposed between the acoustic transducer and said one waveguide and between the return waveguides and the sensors to achieve enhanced coupling between the waveguides and the acoustic transducer and the sensors.

5. Apparatus according to claim 2 in which each acoustic waveguide of the plurality of waveguides comprises narrow passages through which the acoustic wave energy propagates to and from the object, in which there is a coupling volume disposed between the narrow passage of the waveguide that receives wave energy from the acoustic transducer to enhance coupling between the narrow passage and the acoustic transducer, and in which there is a coupling volume disposed between the narrow passage of each waveguide and the sensor associated with the particular sensor to couple the wave energy from the narrow passage to the associated sensor.

6. Apparatus according to claim 5 in which the cross dimensions of each said narrow passage is less than the wavelength of the continuous wave energy propagated therethrough.

7. Apparatus according to claim 1 in which the wave energy is microwave wave energy, in which the plurality of waveguides is a plurality of microwave waveguides, and in which said transducer is a microwave transducer to generate the microwave wave energy which is transmitted by one waveguide of the plurality of microwave waveguides to the interaction region.

8. Apparatus according to claim 7 in which the wave energy after interaction with the object is transmitted to the sensing means by return microwave waveguides of the plurality microwave waveguides.

9. Apparatus according to claim 8 in whcih the coupling-volume means includes a coupling volumen that is interposed between the microwave transducer and said one waveguide and between the return waveguides and the sensors to achieve enhanced coupling between the waveguides and the microwave transducer and the sensors.

10. Apparatus according to claim 7 in which each microwave waveguide of the plurality of waveguides comprises narrow passages through which the wave energy propagates to and from the object, in which there is a coupling volume for wave energy from the microwave transducer to enhance coupling between the narrow passage and the acoustic transducer, and in which there is a coupling volume disposed between the narrow passage of each waveguide and the sensor associated with the particular sensor to couple the wave energy from the narrow passage to the associated sensor.

11. Apparatus according to claim 10 in which the cross dimensions of each said narrow passage is less than the wavelength of the continuous wave energy propagated therethrough.

12. Apparatus according to claim 1 in which the wave energy is electromagnetic wave energy, in which the plurality of waveguides is a plurality of electromagnetic waveguides, which includes an electromagnetic coil to generate the electromagnetic wave energy which is transmitted by one waveguide of the plurality of waveguides to the interaction region.

13. Apparatus according to claim 12 in which the wave energy after interaction with the object is transmitted to the sensing means by return electromagnetic waveguides of the plurality of electromagnetic waveguides.

14. Apparatus for interacting wave energy with an object to derive information about the object, that comprises:

means for directing wave energy of a narrow band of frequencies into an interaction region where the wave energy interacts with the object, said means for directing including transducer means to generate the wave energy and waveguide means disposed to receive the generated wave energy which propagates through the waveguide means to the interaction region, said waveguide means including waveguides positioned to receive the wave energy after interaction with the object and to deliver the wave energy to a sensing region;

sensing means comprising a plurality of sensors disposed in an array at said sensing region to receive the wave energy and operable to convert the received wave energy to electric signals representative of the received wave energy;

said waveguide means including coupling-volume means to achieve enhanced coupling between the waveguides and the transducer and the sensors; and means to extract from the electric signals information indicative of a characteristic of the object.

15. Apparatus according to claim 14 in which the continuous wave energy is acoustic wave energy, in which the means for directing comprises an acoustic transmitter, and in which the waveguide means comprises acoustic waveguides that serve to transmit the acoustic wave energy to the object and the wave energy, after interaction with the object, to the sensors.

16. Apparatus according to claim 15 in which the acoustic waveguides include narrow passages through which the acoustic wave energy propagates, and in which the coupling-volume means includes a coupling volume disposed between the acoustic transmitter and the narrow passage of its associated waveguide to provide coupling between each sensor and the narrow passage of its associated waveguide.

17. Apparatus according to claim 14 in which the continuous wave energy is microwave wave energy, in which the means for directing comprises a microwave transmitter, and in which the waveguide means comprises microwave waveguides that serve to transmit the microwave wave energy to the object and the wave energy, after interaction with the object, to the sensors.

18. Apparatus according to claim 17 in which the microwave waveguides include narrow passages through which the microwave wave energy propagates, and in which the coupling-volume means includes a coupling volume disposed between the microwave transmitter and the narrow passage of its associated waveguide to provide coupling between each sensor and the narrow passage of its associated waveguide.

19. Apparatus according to claim 14 in which the continuous wave energy is electromagnetic wave energy, in which the means for directing comprises an electromagnetic transmitter, and in which the waveguide means comprises high-permeability material that serves to guide the electromagnetic field wave energy to the object, and the electromagnetic wave energy, after interaction with the object, to the sensors.

20. A method of achieving inspecting and/or positioning of an object in an interaction region, that comprises:
    directing continuous wave energy of a narrow band of frequencies through a plurality of waveguides to the interaction region where it interacts with the object, the waveguides being operable to direct the wave energy to the object which interacts therewith and being operable to receive the wave energy after interaction with the object and to deliver it to a sensing region;
    sensing the wave energy with sensors at a multiplicity of places in the sensing region after said interaction and producing electric signals representative of the sensed wave energy;
    processing the electric signals into at least one of amplitude and phase information for each place of said multiplicity of places after interaction with the object; and
    analyzing the at least one of amplitude and phase information of each place of said multiplicity of places into at least one of a geometric characteristic and an electromagnetic characteristic of the object, the analysis of the amplitude and phase information involving calculations of the general form $$X = g\left[\sum_{i=1}^{N} W_i f(A_i, \theta_i)\right],$$

21. Apparatus for achieving inspecting and/or positioning of an object in an interaction region, that comprises:
    means for directing continuous wave energy of a narrow band of frequencies through a plurality of waveguides to the interaction region where it interacts with the object, the waveguides being operable to direct the wave energy to the object which interacts therewith and being operable to receive the wave energy after interaction with the object and to deliver it to a sensing region;
    sensor means for sensing the wave energy at a multiplicity of places in the sensing region after said interaction and for producing electric signals representative of the sensed wave energy;
    means processing the electric signals into at least one of amplitude and phase information for each place of said multiplicity of places after interaction with the object; and
    means for analyzing the at least one of amplitude and phase information of each place of said multiplicity of places into a geometric characteristic and/or an electromagnetic characteristic of the object, the analysis of the phase and amplitude information from each sensor involving calculation of the general form $$X = g\left[\sum_{i=1}^{N} W_i f(A_i, \theta_i)\right],$$

X is the desired output;
g is a functional relationship;
$W_i$ is a weighting function chosen for each sensor;
f is another functional relationship;
$A_i$ is the amplitude of each sensor signal;
$\theta_i$ is the phase of each sensor signal; and
N is the number of sensors.

22. Apparatus for achieving at least one of inspecting and positioning of an object, that comprises:
    an array adapted to generate continuous acoustic wave energy of a single frequency in a gaseous medium, to transmit the wave energy through the gaseous medium to an interaction region where it interacts with the object, said array including a plurality of spaced acoustic waveguides to transmit the wave energy in both directions to and from the object and further including sensor means comprising a multiplicity of acoustic sensors disposed to receive said wave energy from the array of spaced acoustic waveguides after interaction with the object, said sensor means being adapted to produce electric signals representative of the received acoustic wave energy from each of the spaced acoustic waveguides, the ends of the waveguides in the region of the object being small to permit said ends to be placed in close proximity of the object, a coupling volume being interposed between the acoustic sensors and said waveguides to achieve enhanced coupling between the waveguides and the acoustic sensors;
    means for processing the electric signals into at least one of amplitude and phase information for each sensor of the sensor means; and
    means for analyzing said at least one of amplitude and phase information from each sensor of the multiplicity of sensors to provide information about a geometric characteristic of the object.

23. Apparatus for interacting acoustic wave energy with an object in a gaseous medium to derive information about the object, that comprises;
    sound-generating means for generating continuous wave acoustic energy of a narrow band of frequencies;
    means for directing the outgoing continuous wave acoustic energy of a single frequency into an interaction region remote from the sound-generating means;
    means for directing incoming wave energy after interaction with the remote object to sound-detection means that is remotely displaced from the object;

the means for directing continuous wave energy comprising gas-filled narrow passages through which the wave energy is directed in at least one direction with respect to the object;

said sound-detection means comprising a plurality of sensors disposed in an array to receive the wave energy and operable to convert the received wave energy to electric signals representative of the received wave energy; and means to extract from the electric signals information indicative of a characteristic of the object.

24. Apparatus according to claim 23 wherein the sound-generating means and the sound-detection means are within about a meter of said object.

25. Apparatus for interacting acoustic wave energy with an object in a gaseous medium to derive information about the object, that comprises:

sound-generating means for generating continuous wave acoustic energy of a narrow band of frequencies;

means for directing the outgoing continuous wave acoustic energy of a single frequency into an interaction region remote from the sound-generating means;

means for directing incoming wave energy after interaction with the remote object to sound-detection means that is remotely displaced from the object;

said sound-detection means comprising a plurality of sensors disposed in an array to receive the wave energy and operable to convert the received wave energy to electric signals representative of the received wave energy; and means to extract from the electric signals information indicative of a characteristic of the object;

a coupling volume being interposed between the acoustic sensors and said narrow passages to achieve enhanced coupling between the waveguides and the acoustic transducer and the sensors.

26. Apparatus for interacting acoustic wave energy with an object in a gaseous medium to derive information about the object, that comprises:

sound-generating means for generating continuous wave acoustic energy of a narrow band of frequencies;

means for directing the outgoing continuous wave acoustic energy of a single frequency into an interaction region remote from the sound-generating means;

means for directing incoming wave energy after interaction with the remote object to sound-detection means that is remotely displaced from the object;

said sound-detection means comprising a plurality of sensors disposed in an array to receive the wave energy and operable to convert the received wave energy to electric signals representative of the received wave energy; and means to extract from the electric signals information indicative of a characteristic of the object;

the sound-generating means comprising acoustic transducers and the means for directing both the outgoing wave energy and the incoming wave energy comprising air-filled waveguides whose ends at the interaction region are much smaller than the acoustic transducer to present an area small enough to permit the ends of the waveguides to be in close proximity to the object.

27. Apparatus according to claim 26 in which the dimensions of the waveguides perpendicular to the transmission direction of the waveguides is small compared to wavelengths of the acoustic wave energy being transmitted.

28. Apparatus according to claim 26 in which the acoustic wave energy is about 40 kHz whose wavelength is air is about one centimeter and in which the waveguides have dimensions of about 0.1 centimeter.

* * * * *